(12) United States Patent
Svedberg et al.

(10) Patent No.: US 7,463,901 B2
(45) Date of Patent: Dec. 9, 2008

(54) INTEROPERABILITY FOR WIRELESS USER DEVICES WITH DIFFERENT SPEECH PROCESSING FORMATS

(75) Inventors: Jonas Per Henrik Svedberg, Luleá (SE); Per Synnergren, Luleá (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 377 days.

(21) Appl. No.: 11/197,768

(22) Filed: Aug. 5, 2005

(65) Prior Publication Data

US 2006/0034260 A1 Feb. 16, 2006

Related U.S. Application Data

(60) Provisional application No. 60/601,121, filed on Aug. 13, 2004.

(51) Int. Cl.
H04B 7/00 (2006.01)
(52) U.S. Cl. ............... 455/518; 455/519; 455/563; 375/377; 370/395.2; 370/467
(58) Field of Classification Search ............. 455/518, 455/519, 563; 375/377, 467; 370/395.2, 370/467
See application file for complete search history.

(56) References Cited

U.S. PATENT DOCUMENTS

| | | | | |
|---|---|---|---|---|
| 7,227,922 | B2 * | 6/2007 | Klaghofer et al. | 375/377 |
| 7,266,611 | B2 * | 9/2007 | Jabri et al. | 709/231 |
| 2003/0026280 | A1 | 2/2003 | Mansouri et al. | |
| 2004/0101125 | A1 * | 5/2004 | Graf et al. | 379/229 |
| 2004/0110539 | A1 | 6/2004 | El-Maleh et al. | |
| 2004/0264470 | A1 * | 12/2004 | Sirbu | 370/395.2 |
| 2005/0091047 | A1 * | 4/2005 | Gibbs et al. | 704/219 |

2005/0227657 A1 10/2005 Frankkila et al.

FOREIGN PATENT DOCUMENTS

| | | |
|---|---|---|
| EP | 0664658 | 7/1995 |
| EP | 0981253 | 2/2000 |

(Continued)

OTHER PUBLICATIONS

Push-to-talk over Cellular (PoC); Architecture; PoC Release 2.0; Architecture V2.0.8 (Jun. 2004).

(Continued)

*Primary Examiner*—Sanh D Phu
(74) *Attorney, Agent, or Firm*—Nixon & Vanderhye P.C.

(57) ABSTRACT

Interoperability is achieved between wireless user communication devices that have different speech processing formats and/or attributes. A first wireless user communication device includes a primary speech codec that encodes a first speech message using a first speech encoding format. The encoded speech is then sent to a second wireless user communications device that includes a primary speech codec supporting a second speech encoding format. The first user device receives from the second user device a second speech message encoded using the second speech encoding format. The second speech message is then decoded by the first user device using a second speech decoder supporting decoding of the second speech encoding format. But the first communication device does not support speech encoding using the second speech encoding format—regardless of whether the first communication device includes or does not includes an encoder for encoding speech using the first speech encoding format.

19 Claims, 6 Drawing Sheets

FOREIGN PATENT DOCUMENTS

EP    1301030    4/2003

OTHER PUBLICATIONS

A. Li; IETF; "RTP Payload Format for Enhanced Variable Rate Codecs (EVRC) and Selectable Mode Vocoders (SMV)," RFC3558; Jul. 2003.

J. Rosenberg and H. Schulzrinne; IETF; "An Offer/Answer Model with the Session Description Protocol (SDP)," RFC3264; Jun. 2002.

Notification of Transmittal of the International Search Report and the Written Opinion of the International Searching Authority, or the Declaration mailed Nov. 16, 2005 in corresponding PCT Application PCT/SE2005/001208.

* cited by examiner

INTEROPERABILITY FOR WIRELESS USER DEVICES WITH DIFFERENT SPEECH PROCESSING FORMATS

CROSS-REFERENCE TO PROVISIONAL APPLICATION

This application claims priority from commonly-assigned U.S. patent provisional application Ser. No. 60/601,121, entitled "Asymmetrical encoding and transport in PoC," filed on Aug. 13, 2004, the content of which is incorporated here by reference.

TECHNICAL FIELD

The technical field is wireless communications. The present invention relates to providing interoperability between wireless user devices that use different speech processing formats. An advantageous example application is Push-to-talk over Cellular (PoC) applications.

BACKGROUND AND SUMMARY

Push-to-talk over Cellular (PoC) provides a type of half-duplex or one-way communications service between two or more users. Users often form a group and then communicate with each other in a "point-to-multipoint" fashion. The communications are one-way: while one person (user) speaks, the others listen. A "turn" to speak is generally granted on a first come, first serve basis in response to a user pressing a push to talk button on the user's wireless terminal/user equipment. PoC functionality is typically delivered across operator networks using Voice over IP (VoIP) protocols, although other technology implementations are possible.

Figure 1:
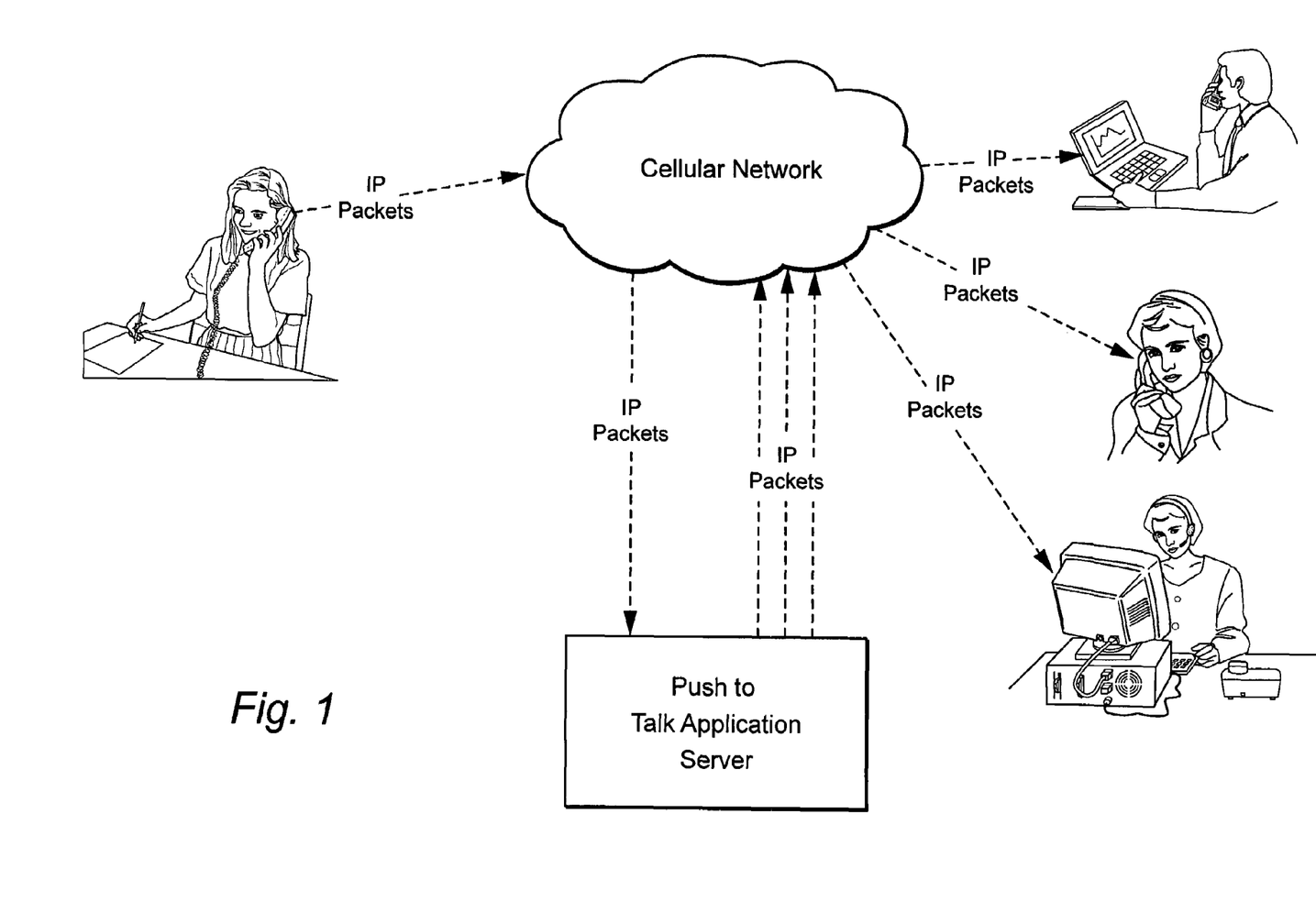
FIG. 1 is an illustration of a Push-to-talk over Cellular (PoC) group call.
Figure 2:
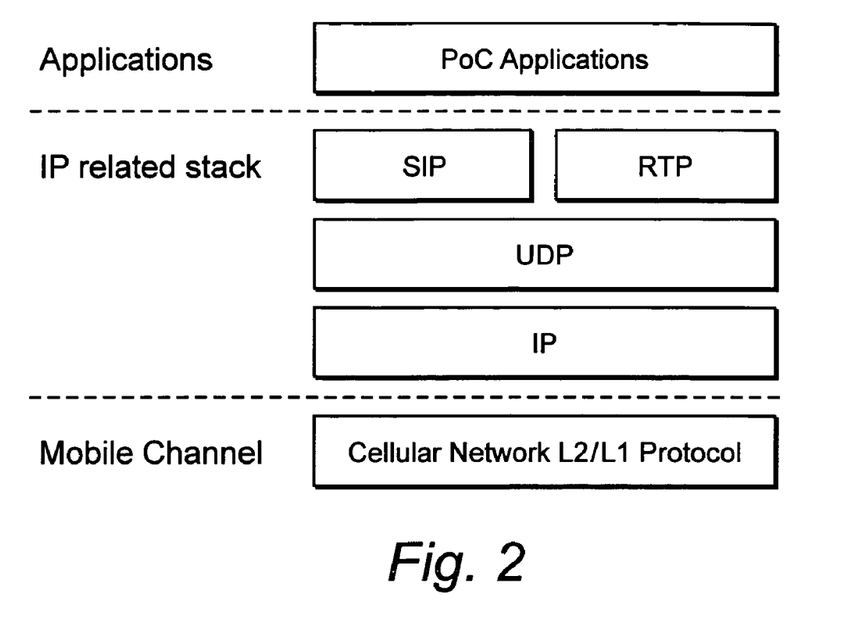
FIG. 2 is an example communications protocol stack for PoC communications.

Push-to-talk over Cellular can be viewed as an IP Multimedia Subsystem (IMS) based "voice chat" service for cellular telecommunication systems. As shown in FIG. 1, a sending PoC client terminal sends packet data traffic to a PoC server, and in the case of a group call, the PoC server duplicates the traffic to all recipients in the group. As an IMS service, PoC utilizes the Session Initiation Protocol (SIP) to set-up a voice communication between two or more PoC clients. FIG. 2 illustrates an example communications protocol stack for PoC. The PoC application operates on an IP related stack that includes SIP, and Real-time Transport Protocol (RTP) is used to handle the voice packet delivery on the user plane. The SIP and RTP protocols employ the underlying User Data Protocol (UDP) and IP protocols that operate themselves on top of link layer (L2) and physical layer (L1) protocols used in the cellular radio access network.

Figure 3:
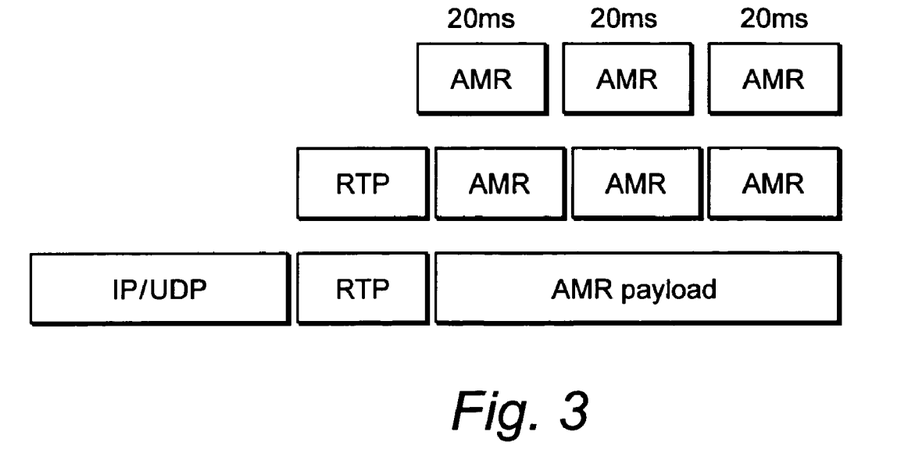
FIG. 3 shows multiple speech codec frames packed into a frame.

FIG. 3 shows one example of mapping voice packets to a IP/UDP frame. The voice is divided into 20 msec speech encoded frames. The example speech encoding technique shown is adaptive multi-rate (AMR). AMR is a variable rate speech codec selected by the 3GPPP for 3G WCDMA cellular communications. Using the Algebraic Code Excited Linear Predictive (ACELP) compression technology, AMR provides toll quality sound at transmission rates from 4.75 to 12.2 Kbps. Multiple AMR frames are used to fill the AMR payload of the IP/UDP packet.

The SIP protocol carries the Session Description Protocol (SDP) that is used to exchange session details between two PoC clients such as the type of media, codec, or sampling rate, etc. This SDP information is carried by the SIP message in a way that is analogous to a document attachment being carried by an email message, or a web page being carried in an HTTP message. One SDP media capability that is exchanged during the voice communication session set-up is the speech codec supported by the PoC client and the media transport port(s) to be used for that speech codec.

PoC is currently being standardized and agreed upon in the Open Mobile Alliance (OMA) forum. Ideally, the PoC services specified should be access technology independent. But in practice, this probably will not happen—particularly with respect to speech codec technology. OMA has proposed that different access technology organizations, e.g., 3GPP2 for CDMA2000 (IMT-2000) access technology and 3GPP for WCDMA access technology, each chose an appropriate speech codec for its respective organization that best suits its associated access technology. In this example, it may be that 3GPP will choose an AMR codec for PoC, and 3GPP2 will chose an Enhanced Variable Rate Coder (EVRC) as the speech codec for PoC. An EVRC codec is a Relaxation Code Excited Linear Prediction (RCELP) based codec and uses three rates: full rate at 8.5 kbps, half rate at 4 kbps, and eight rate at 800 bps and works with a 20 msec speech frame.

A problem with users having different codecs is that they do not operate together. But interoperability is essential regardless of the user's access network. Interoperability is required both in the user equipment and in the network server supporting the service. In the PoC context, this means speech codec interoperability must be provided by PoC clients and PoC servers.

One approach to provide interoperability is for the network infrastructure to support transcoding. In a PoC example, a transcoder located in the PoC server would translate between different speech coding and decoding techniques. But the drawbacks with transcoding are substantial. First, transcoding between two low rate codec modes significantly reduces speech quality. Second, transcoding operations between thousands of PoC clients would require powerful and expensive data processing resources in the PoC server. Third, transcoding would likely increase end-to-end delay between the PoC clients reducing the quality of the PoC service. Fourth, there is no standardized transcoder currently available. Another approach might be employ multiple codecs in each PoC client and PoC server to ensure a common codec. But here the cost is likely prohibitive—at least in a commercial context.

Another interoperability problem is how to handle the use of different radio access bearers/transport formats. Even though two PoC clients may use the same "native" speech codec, those clients may use different radio access bearers for the PoC service. Consider an example where a 3GPP2 client terminal uses a "conversational class" bearer optimized for VoIP which produces a media stream with one EVRC full rate frame per IP packet. The other terminal may also be a 3GPP2 client terminal, but it uses a general purpose "interactive class" packet switched bearer, and thus would prefer media streams, (e.g., four EVRC frames per IP packet), to avoid unacceptable end-to-end media delay.

The invention overcomes these problems and achieves interoperability between wireless user devices having different speech processing capabilities and/or different transport bearer formats tailored to a particular speech encoding format. A first wireless user communication device includes a primary speech codec that encodes a first speech message using a first speech encoding format. The encoded speech is then sent to a second wireless user communications device that includes a primary speech codec supporting a second speech encoding format. The first user device receives from the second user device a second speech message encoded using the second speech encoding format. The second speech message is then decoded by the first user device using a second speech decoder supporting decoding of the second speech encoding format. But the first communication device does not support speech encoding using the second speech encoding format—regardless of whether the first communication device includes or does not includes an encoder for encoding speech using the first speech encoding format.

The first speech message is transported using a first type of transport bearer that uses a first packetizing of speech encoded frames. The second speech message is transported using a second type of transport bearer that uses a second packetizing of speech encoded frames. The communication system includes a service support server for supporting the communication between the first and second devices. The server re-packetizes at least a portion of the first speech message before the first speech message is sent to the second wireless communication device.

The first user device sends the service support server a signaling message that includes one or more attributes indicating that the first user device supports speech encoding and decoding using the first speech encoding format and decoding of speech encoded using the second speech encoding format, but does not support encoding speech using the second speech encoding format. The signaling message preferably also includes one or more attributes indicating that the first wireless user communication device supports a first transport bearer format for speech encoded using the first speech encoding format and a second transport bearer format for speech encoded using the second speech encoding format.

In one non-limiting, example application, the first and second wireless user communications devices are Push-to-talk (PTT) type communications devices. One example of a PTT communication is a PTT over Cellular (PoC) communication.

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using a non-limiting example to Push-to-talk over Cellular (PoC), the present invention is not limited to PoC and may be employed in any type of radio communications between wireless user communications devices.

In some instances, detailed descriptions of well-known methods, interfaces, circuits, and signaling are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

In general, wireless clients communicate using a radio access network over a wireless interface. Non-limiting examples of two different access network technologies include a UMTS (Universal Mobile Telecommunications System) and an IMT-2000 (International Mobile Telecommunications 2000) system. The UMTS system includes one or more core networks coupled to a radio access network called a UTRAN which means UMTS Terrestrial Radio Access Network. The UTRAN includes one or more radio network controllers (RNCs) coupled to one or more base stations sometimes referred to as Node-B's. The radio access network communicates with multiple user equipments (UEs) over a wireless interface. A UE includes but is not limited to a subscriber terminal, a mobile terminal, a mobile phone, a cell phone, a mobile station, a wireless terminal, etc., and includes any terminal having a speech communication capability. For example, the user equipment may be a terminal (such as a personal computer PC) having Internet access and VoIP capability for voice communication over the Internet.

Figure 4:
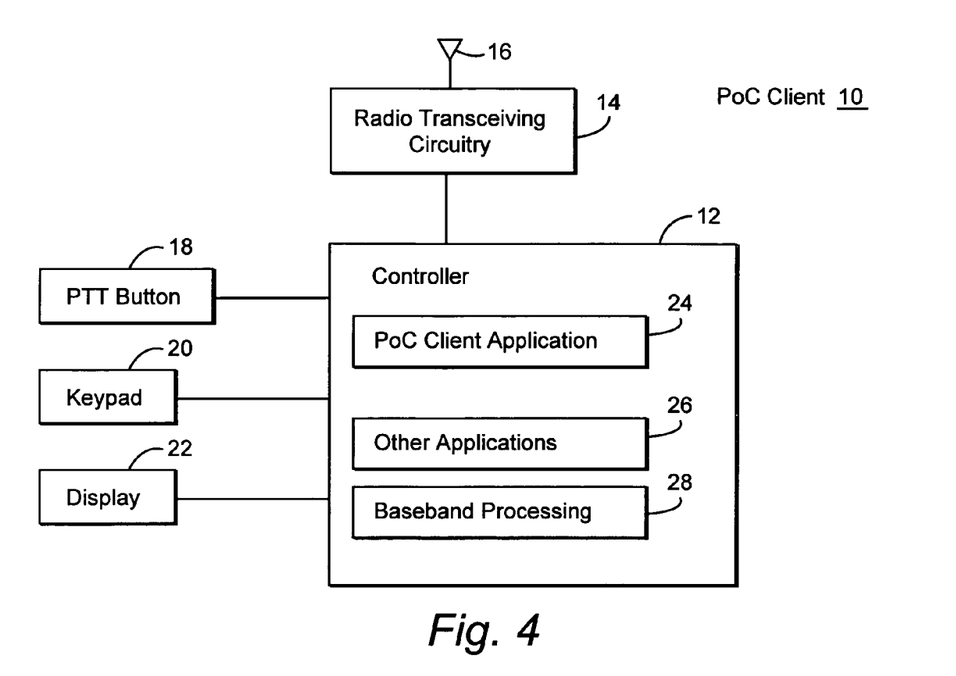
FIG. 4 is a function block diagram of a PoC client.

An example of a possible implementation of user equipment configured for PoC communications is a PoC client 10 illustrated as a simplified block diagram in FIG. 4. Radio transceiving circuitry 14 is coupled to an antenna 16 and a controller 12. The controller 16 includes baseband signal processing 28 which performs any kind of baseband signal processing required in any specific implementation, such as an analog-digital (A/D) conversion of analog speech signals from a microphone (not shown), voice encoding, IP packet building, frame building, de-framing, IP packet de-building, voice decoding, and digital-analog (D/A) conversion of a received digital speech signal into an analog signal applied to a loudspeaker (not shown). The voice coder and decoder are often referred to as a codec which performs speech compression/decompression and error detection/correction coding/decoding. Different codecs use different compression/decompression algorithms and usually provide different coding/decoding rates.

The controller 12 includes PoC client communications application software 24 and other applications software 26. The controller 12 further controls signaling, both out-band (e.g., SIP) and in-band or embedded, as well as IP packet building and de-building. The start and stop of a speech message is set by a PTT button or switch 18 coupled to the controller 12, which can be replaced by any user-operated device, such as a voice activity detector (VAD). A user interface may include a display 22 and a keyboard 20 coupled to the controller 12.

The PoC client application 24 provides the PoC communication service. In case of a PoC group communication, the client application 24 maintains group information, such as group identification information and group membership information. The communication client 24 may also provide tools for group creation, for attaching to (oining) a group and for detaching from (leaving) the group, obtaining "floor" control, starting and ending a speech message, etc.

Figure 5:
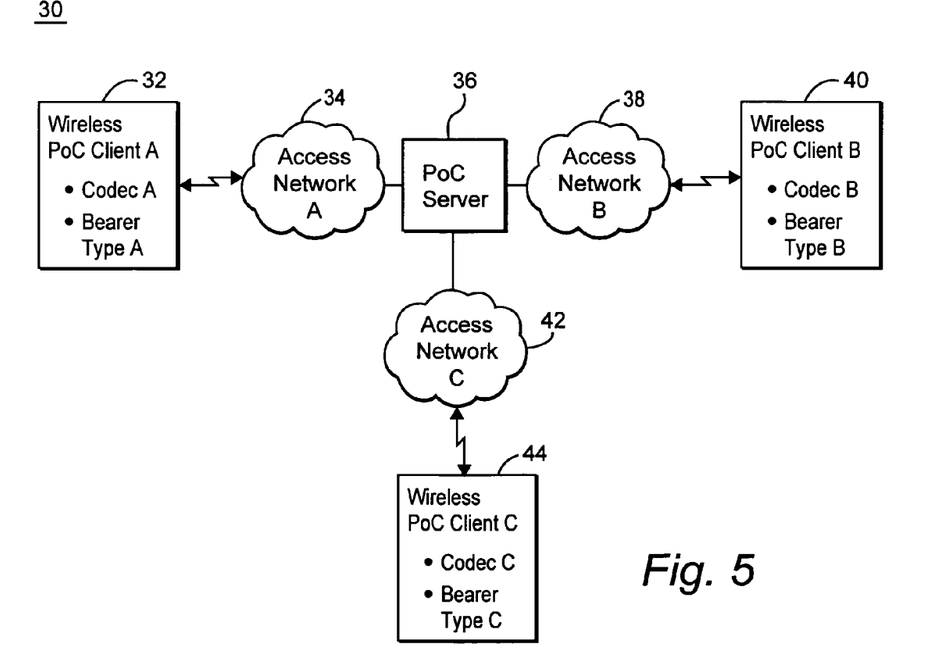
FIG. 5 is a diagram of PoC clients communicating in a PoC call using different access networks with different codecs and different bearer or transport formats.

FIG. 5 illustrates an example diagram 30 of PoC clients communicating in a PoC call using different access networks with different codecs and different bearer/transport formats. The wireless PoC client A 32 includes a codec of type A and uses a radio access bearer of type A or transport format of type A. Codec A uses a certain type of speech compression/decompression algorithm and employs various coding rates. Example speech different compression/decompression algorithms include CELP, ACELP, RCELP, and eXtended CELP. Examples of different radio access bearer types/transport format types used in 3GPP include conversational class, interactive class, streaming class, and background class. Radio access-bearer (RAB) service attributes, which can be used to differentiate the management of radio access bearers within the UMTS Terrestrial Radio Access Network (UTRAN), have also been defined and include: traffic class, maximum bit rate, guaranteed bit rate, delivery order, maximum Service Data Unit (SDU) size, SDU format information, SDU error ratio, residual bit error ratio, delivery of erroneous SDUs, transfer delay, traffic handling priority (THP), allocation and retention priority, source statistics descriptor, and signaling indication.

The PoC client A 32 is coupled via access network 34 to a PoC server 36 that orchestrates PoC services. The wireless PoC client B 40 is coupled to the PoC server 36 via an access network B 38 and includes a codec of type B and uses a radio access bearer of type B or transport format of type B. The wireless PoC client C 44 is coupled to the PoC server 36 via access network C 42 and includes a codec of type C and uses a radio access bearer of type C or transport format of type C. Each codec A, B, and C uses a different type of speech compression/decompression algorithm with different coding rates and different bearer/transport formats. Absent some interoperability mechanism, the different codecs and different bearer transport formats prevent PoC communications between the PoC clients.

This lack of interoperability is demonstrated in the PoC signaling example below. In IMS applications, SIP and SDP are used for signaling. The most important method in SIP is the INVITE method used to establish a session between participants. A session is a collection of participants, and streams of media between them, for the purposes of communication. A UE initiates a PoC call by generating an initial INVITE request. In the Session Description Protocol (SDP), the session description may contain a number of media descriptions. Each media description starts with an "m=" field, and is terminated by either the next "m=" field or by the end of the session description. The format of the SDP Media description may be as follows: m=(media name and transport address), i=(media title), c=(connection information—optional if included at session-level), b=(bandwidth information), k=(encryption key), a=(zero or more media attribute lines). A media field may also have several sub-fields: m=<media><port><transport><fmt list>. The first sub-field is the media type. Currently defined media include: "audio", "video", "application", "data" and "control".

The second sub-field is the transport port to which the media stream will be sent. TCP/IP transport layer addressing is accomplished using TCP and UDP ports. Each port number within a particular IP device identifies a particular software process. The meaning of the transport port depends on the network being used as specified in the relevant "c" field and on the transport protocol defined in the third sub-field. For some applications, it may be necessary to specify multiple transport ports. For RTP, only the even ports may used for data and the corresponding one-higher odd port may be used for RTCP. For example, m=video 49170/2 RTP/AVP 31 specifies that ports 49170 and 49171 form one RTP/RTCP pair and 49172 and 49173 form the second RTP/RTCP pair. RTP/AVP is the transport protocol and 31 is the format. The third sub-field is the transport protocol. The fourth and subsequent sub-fields are media formats.

Assume in our example, that the 3GPP2 community has chosen EVRC as its mandatory speech codec, that PoC user A uses a 3GPP2 PoC client A, and that PoC client A uses an IP-only radio access bearer called Service Option 33 (O33). Assume PoC user B uses a 3GPP2 terminal called PoC client B and a radio access bearer optimized for VoIP called Service Option 60 (SO60). Assume the 3GPP community has chosen AMR as its mandatory speech codec, that PoC user C uses a 3GPP terminal called PoC client C, and that PoC client C is a GSM phone using AMR5.15 as default speech codec mode. The problem then is how to achieve interworking between PoC client A, PoC client B, and PoC client C.

Each PoC client has only one "native" speech codec implemented. This native speech codec contains both an encoder and a decoder. In this example, the native speech codec is an AMR codec if the PoC client is implemented on a 3GPP terminal or an EVRC codec if the PoC client is implemented on a 3GPP2 terminal. Furthermore, each PoC client includes one or more other secondary or non-native speech decoders that provide interoperability with non-native speech codecs. So to achieve interoperability in the example above, the 3GPP terminal also includes a secondary or non-native EVRC speech decoder, and the 3GPP2 terminal also includes a secondary or non-native AMR speech decoder.

The PoC client uses the native speech codec for speech encoding and decoding. But the PoC client can also decode speech from another PoC client's native speech codec, regardless of what type of native speech codec the other PoC uses, using an appropriate non-native speech decoder. The PoC client does not support encoding speech using a non-native speech encoder or encoding format. This means the PoC client either cannot perform non-native speech encoding or is configured not to perform non-native speech encoding even though the PoC client may have the ability to perform non-native speech encoding. This may result in "asymmetrical encoding." In the example, AMR encoded bits are sent in one direction of the conversation while EVRC encoded bits are sent in the other direction.

The interoperability approach has several advantages. It is less expensive to only implement a speech decoder as compared to the full speech codec since much of the expense associated with a codec is in the speech encoder part of the codec. Because a speech decoder is less complex than a speech encoder, a non-native speech decoder can be implemented as a software decoder running on a microprocessor rather than a hardware-based decoder, e.g., a DSP. The non-native speech decoder may also be implemented use a native codec DSP. Since PoC is a half duplex service, the additional speech decoder can be loaded into the DSP during reception of speech while the native speech codec is loaded into the DSP while encoding speech Consider the following example and non-limiting SDP signaling message for a PoC client that supports multiple speech codecs.

```
m=audio 62986 RTP/AVP 0 4 18
a=rtpmap:0 AMR/8000
a=rtpmap:4 G723/8000
a=rtpmap:18 G729/8000
```

The SDP message above indicates support for speech codecs AMR, G723 and G729 all on transport port 62986. An example situation where the speech codecs use different transport ports might look like:

```
m=audio 62986 RTP/AVP 0
a=rtpmap:0 AMR/8000
m=audio 62987 RTP/AVP 4
a=rtpmap:4 G723/8000
m=audio 62988 RTP/AVP 18
a=rtpmap:18 G729/8000
```

To indicate if a PoC client only wants to send, receive, or both send and receive media from another PoC client, the following directional attributes may be used:

```
a=sendonly
a=recvonly
a=sendrecv
```

In the initial SIP/SDP signaling, the PoC client uses the SDP attribute a=sendrecv to signal the native and preferred speech codec. The native speech codec is given a certain transport port denoted for example by port X. Similarly, the PoC client uses the SDP attribute a=recvonly to signal one or more additional speech decoders it supports. Each additional speech decoder is given a transport port different from the native speech codec. In this example, the additional speech decoder is denoted by port Y.

Because the additional speech decoder uses a different transport port as compared to the native speech codec, the receiving PoC client receives native speech codec data on one transport port (port X) and the non-native speech coded data on another transport port (port Y). Consequently, the receiving PoC client's non native speech coded data may be transported over a radio access bearer using one type of transport format, while native speech coded data may be transported over another radio access bearer using another type of transport format.

The PoC client may signal its native speech codec using more than one m-line in SDP (using different transport ports). This indicates that the speech codec may be used with different settings when used over different radio bearers. When different radio bearers are used, the PoC server re-packetizes the speech coded frames. Re-packetization describes changing packets from one packet-format to another packet format without modifying the actual speech information bits, e.g., the payload is not changed. An example is changing packets between header-less and interleaved/bundled packets formats. For instance, one PoC client on a 3GPP2 terminal may use a radio access bearer optimized for VoIP called Service Option 60 (SO60) and thus use a header-less packet format. Another 3GPP2 PoC client may use an IP-only radio access bearer called Service Option 33 (SO33) and an interleaved/bundled packet format. To ensure interoperability, the PoC server re-packetizes between these two packet formats.

The PoC clients may use frame bundling which means that more than one speech coded frame is sent per IP packet (see the example of frame bundling shown in FIG. 3). The number of speech frames per IP packet is signaled using the SDP 'ptime' attribute. To ensure that packets are handled correctly by the client, the server may have to re-packetize the speech frames according to the agreed ptime or re-negotiate the ptime attribute, i.e., user plane adaptation, which is a slower process than re-packetization. If the two PoC clients signal different ptime's because they use different radio bearers, the PoC server must perform re-packetizing since the client negotiates a desired ptime attribute to the limitations of the negotiated radio bearer. Frame packetization is used to reduce the media bit rate in the absence of header compression. Consider this example. If a codec produces a 5 kbps media stream and the IP overhead for one 20 msec codec frame is about 16 kbps, the total IP bit rate is about 21 kbps. But if four frames are packetized per IP packet, the total IP bit rate goes down to about 9 kbps. In that case, a 10 kbps radio bearer may be used. Therefore, ptime together with the codec mode indicate the downlink throughput to the UE, thereby defining the bit rate at which the UE can receive data. If the PoC server receives a data stream that uses a higher bandwidth than that downlink bandwidth, the PoC server must re-packetize.

Consider another example involving an EVRC headerless transport format in combination with Service Option 60 (SO60), which is a radio access bearer optimized for VoIP. Assume the PoC server receives EVRC frames with a transport format header and detects that the outgoing connection leg uses a headerless format, and thus, most probably SO60. The PoC server must re-packetize to remove the transport format header because the radio bearer used in the outgoing leg will not have room to transport the header.

Figure 6:
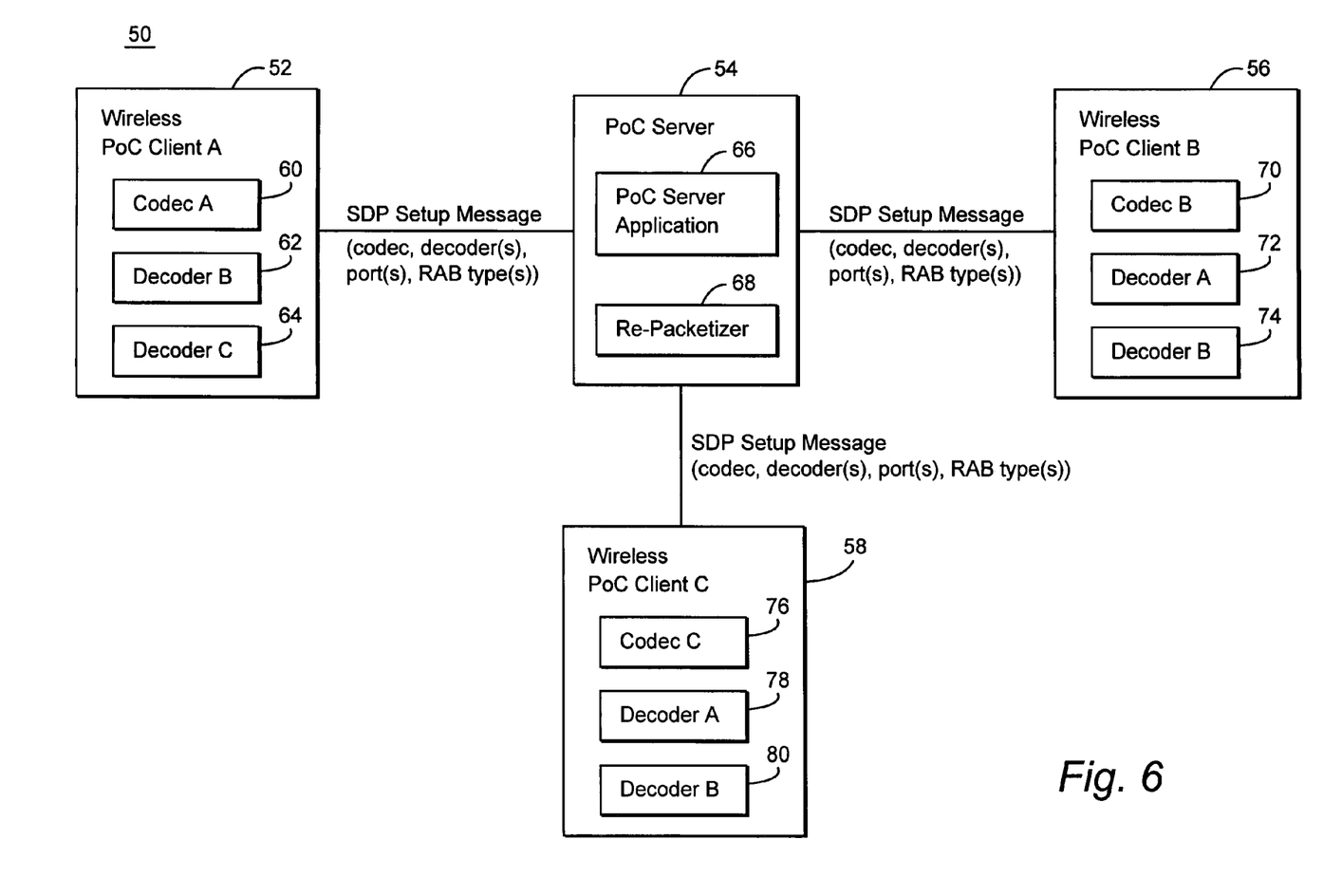
FIG. 6 is diagram of an interoperability solution for PoC clients communicating in a PoC call using different access networks with different codecs and different bearer or transport formats.

Consider the example PoC configuration 50 in FIG. 6 where the interoperability problems identified in conjunction with FIG. 5 are solved using the techniques just described. The PoC client A 52 includes non-native speech decoders B 62 and C 64 in addition to its native speech codec A 60. During the PoC call setup, the PoC client A sends a SIP/SDP setup message that specifies the native codec, the supported non-native speech decoder(s), and the corresponding transport ports and radio access bearers/transport formats. The PoC client A is coupled to the PoC server 54 that includes a PoC server application 66 and a re-packetizer 68. Also coupled to the PoC server 54 are PoC clients B 56 and C 58. The PoC client B includes non-native speech decoders A 72 and C 74 in addition to its native speech codec B 70. During the PoC call setup, the PoC client B sends a SIP/SDP setup message that specifies the native codec, the supported non-native speech decoders, and the corresponding transport ports and radio access bearers/transport formats. PoC client C includes non-native speech decoders A 78 and B 80 in addition to its native speech codec C 76. During the PoC call setup, the PoC client C sends a SIP/SDP setup message that specifies the native codec, the supported non-native speech decoders, and the corresponding transport ports and radio access bearers/transport formats.

When a PoC client sends speech to the group encoded using its native speech coder, receivers with different speech codecs use the appropriate non-native speech decoder to decode that speech. The PoC server re-packetizer 68 re-packetizes the speech when the PoC clients use different radio bearers or other transport formats.

Figure 7:
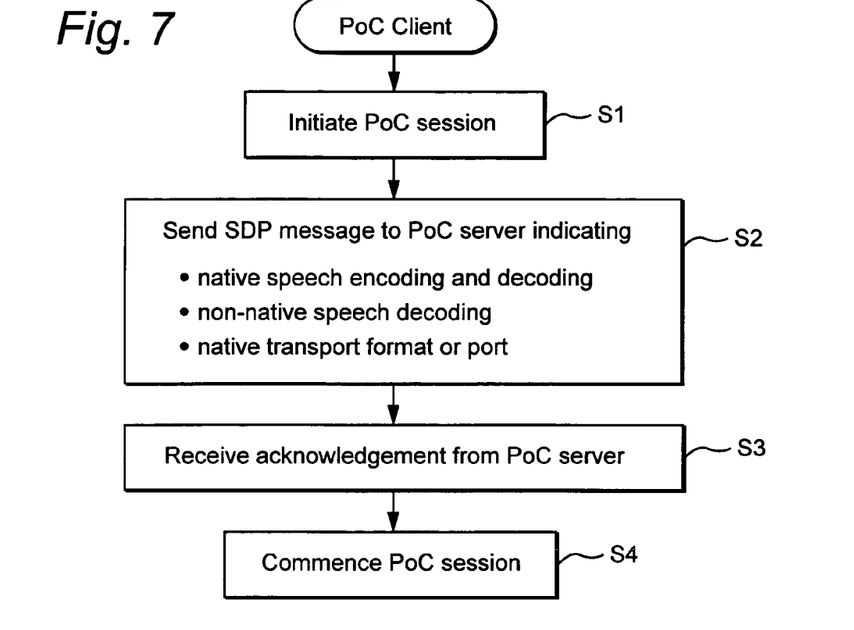
FIG. 7 is a flowchart illustrating example, non-limiting procedures for a PoC client from FIG. 6.

FIG. 7 is a flowchart that illustrates non-limiting example procedures followed by a PoC client for a PoC session setup that permits interoperabililty with other PoC clients that have different speech processing and transport formats. The PoC client may initiate the PoC session, e.g., a group call (step S1). The PoC client formulates and includes in the SIP signaling to the PoC server and SDP message indicating the native preferred speech codec, non-native speech decoding supported, and transport formats supported for the native codec and non-native decoder(s) (step S2). The PoC server acknowledges that message with the PoC client (step S3). Once the PoC session is set up, the call commences, and speech traffic is encoded and communicated, e.g., to the group (step S4).

Figure 8:
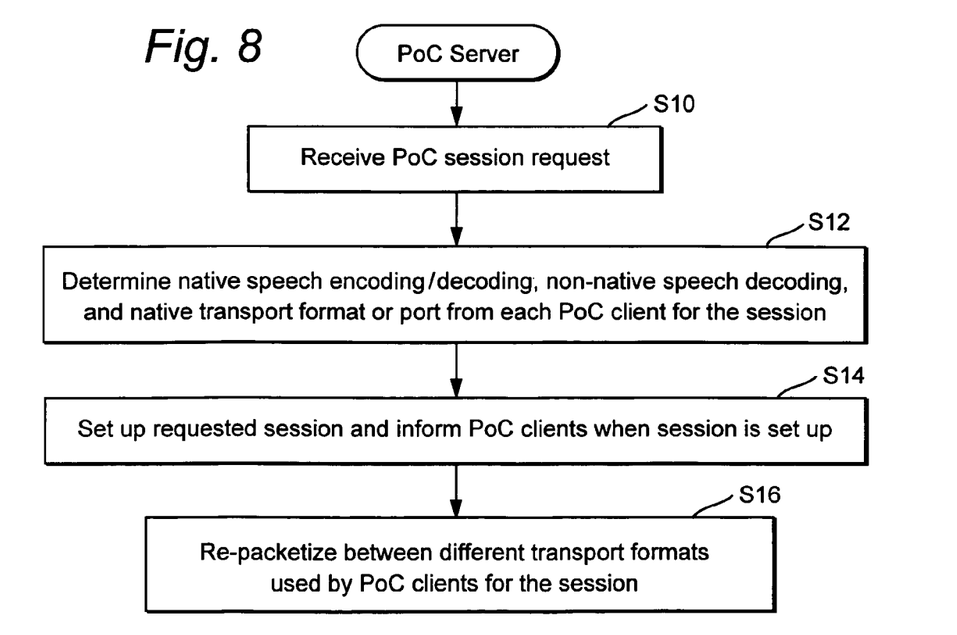
FIG. 8 is a flowchart illustrating example, non-limiting procedures for a PoC server from FIG. 6.

FIG. 8 is a flowchart that illustrates non-limiting example procedures followed by a PoC server for a PoC session setup that permits interoperabililty between PoC clients that have different speech processing and transport formats. A PoC client PoC session request, e.g., for a group call, is received (step S10). The PoC server receives from each PoC client an SDP message that indicates the native speech codec, non-native speech decoding supported, and transport formats supported for the native codec and non-native decoder(s) (step S12). The PoC server acknowledges that message with the PoC client and sets up the requested session (step S14). Once the PoC session is set up, the call commences, and speech traffic is encoded and communicated, e.g., to the group. The PoC server re-packetizes received IP packets to accommodate different transport formats and codec coding rates between the PoC clients (step S16).

Figure 9:
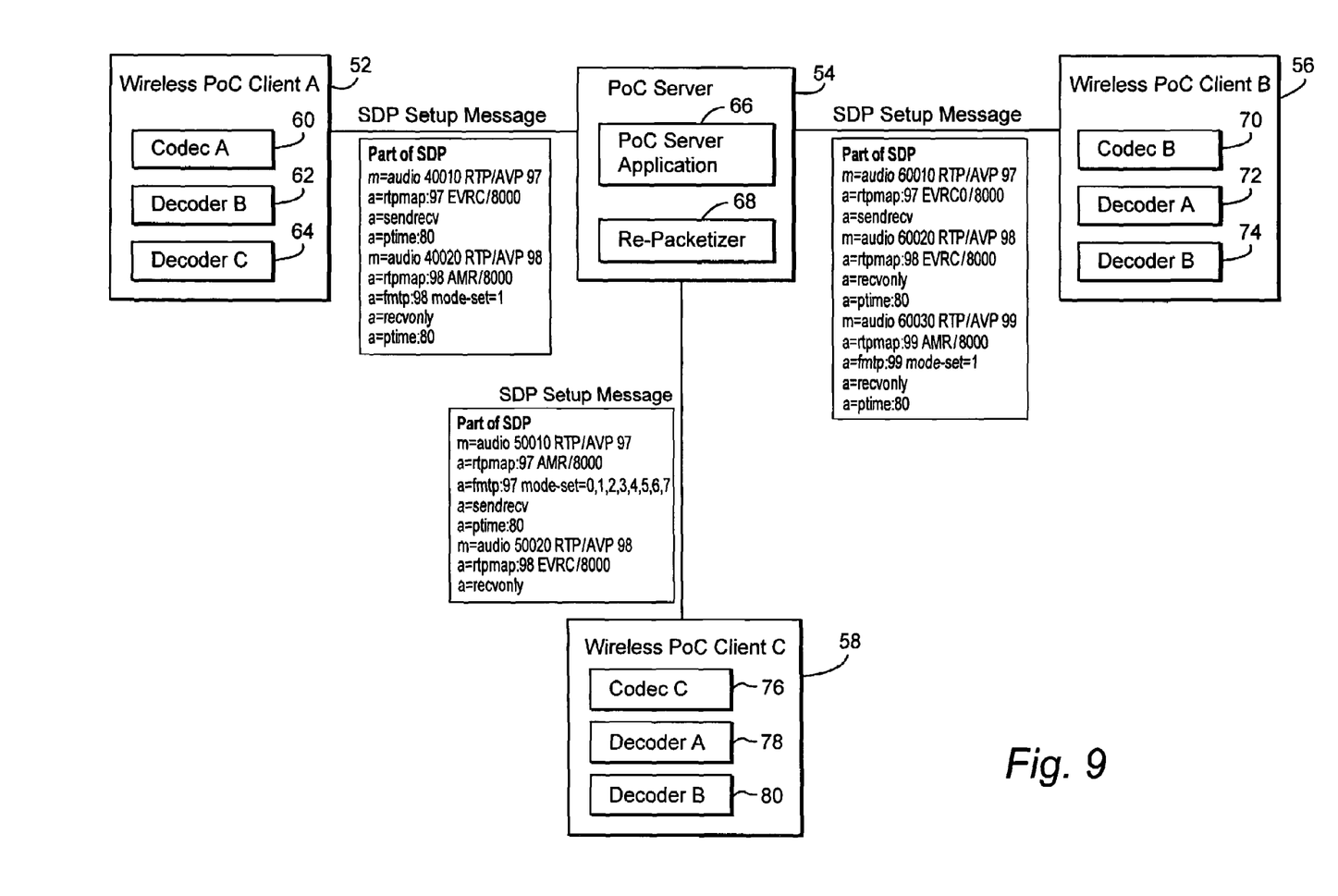
FIG. 9 is a a PoC call set example.

Consider the following PoC call setup example illustrated in FIG. 9 which shows specific PoC call setup SIP/SDP messages sent to the PoC server 54. Part of the SDP message from PoC client A to the PoC server 54 includes:

```
m=audio 40010 RTP/AVP 97 a=rtpmap:97 EVRC/8000
a=sendrecv
a=ptime:80
m=audio 40020 RTP/AVP 98 a=rtpmap:98 AMR/8000
a=fmtp:98 mode-set=1
a=recvonly
a=ptime:80
```

From the SDP message, it can be determined that the PoC client A signals support for encoding and decoding using EVRC (a=sendrecv), where the use of the 'sendrecv' attribute indicates the preferred native speech codec and the interleaved/bundled packet (a=rtpmap:97 EVRC/8000) format for transport. The RTP packets containing EVRC frames are to be transported to port 40010 (m=audio 40010 RTP/AVP 97). The traffic to port 40010 is routed over SO33, and four EVRC frames are to be bundled per RTP packet (a=ptime:80). The PoC client A also signals support for decoding of AMR frames (a=recvonly). RTP packets containing AMR frames are to be transported to port 40020 (m=audio 40020 RTP/AVP 98), and traffic to port 40020 is routed over SO33. The default AMR codec mode is AMR5.15 (a=fmtp 98 mode-set=1). Four AMR frames are to be bundled per packet (a=ptime:80).

Part of the SDP message from PoC client B to the PoC server 54 includes:

```
m=audio 60010 RTP/AVP 97 a=rtpmap:97 EVRC0/8000
a=sendrecv
m=audio 60020 RTP/AVP 98 a=rtpmap:98 EVRC/8000
a=recvonly
a=ptime:80
m=audio 60030 RTP/AVP 99 a=rtpmap:99 AMR/8000
a=fmtp:99 mode-set=1
a=recvonly
a=ptime:80
```

From the SDP message, it can be determined that the PoC client B signals support for encoding and decoding using EVRC (a=sendrecv). The use of the 'sendrecv' attribute indicates the preferred native speech codec. A header-free packet format is used for transport (a=rtpmap:97 EVRCO/8000). The EVRC frames are to be transported to port 50010 (m=audio 50010 RTP/AVP 97). Traffic to port 50010 is routed over SO60. The interleaved/bundled packet format is used to receive EVRC frames (a=rtpmap:98 EVRC/8000, a=recvonly). The EVRC frames using the interleaved/bundled packet format are to be transported to port 50020 (m=audio 50020 RTP/AVP 98). Traffic to port 50020 is routed over SO33. Four EVRC frames are bundled per RTP packet (a=ptime:80). The PoC client B also signals support for decoding of AMR frames (a=recvonly), and RTP packets containing AMR frames are to be transported to port 40020 (m=audio 40020 RTP/AVP 98). Traffic to port 40020 is routed over SO33. The default AMR codec mode is assumed to be AMR5.15 (a=fmtp 98 mode-set=1). There is bundling of 4 AMR frames per packet (a=ptime:80).

Part of the SDP message from PoC client C to the PoC server 54 includes:

```
m=audio 50010 RTP/AVP 97 a=rtpmap:97 AMR/8000
a=fmtp:97 mode-set=0,1,2,3,4,5,6,7
a=sendrecv
a=ptime:80
m=audio 50020 RTP/AVP 98 a=rtpmap:98 EVRC/8000
a=recvonly
```

From the SDP message, it can be determined that the PoC client C signals support for encoding and decoding using AMR (a=sendrecv). The use of the 'sendrecv' attribute indicates the preferred native speech codec. The RTP packets containing AMR frames are to be transported to port 60010 (m=audio 60010 RTP/AVP 97). Traffic to port 60010 is routed over an interactive or streaming packet switched bearer. All AMR codec modes (a=fmtp 98 mode-set=0,1,2,3,4,5,6,7) are supported, but the client starts to encode speech using the default AMR mode AMR 5.15 in this example. Four AMR frames are bundled per RTP packet (a=ptime:80). The PoC client C also signals support for decoding of EVRC frames (a=recvonly). The RTP packets containing EVRC frames are to be transported to port 60020 (m=audio 60020 RTP/AVP 98). Traffic to port 60020 is routed over an interactive or streaming packet switched bearer. The interleaved/bundled packet format is used for transport (a=rtpmap:98 EVRC/8000). Four EVRC frames are bundled per RTP packet (a=ptime:80).

Operation of the example PoC interworking scenario is now described for a group communication involving PoC client A, PoC client B, and PoC client C. First, the PoC client A user activates PTT to send a talk burst 1 to the group. Talk burst 1 is encoded using EVRC and is sent using the interleaved/bundled packet format over SO33 to the PoC server 54 via PoC client A's access network(s). Before forwarding the PoC the talk burst 1 to the PoC client B, the PoC server 54 determines if the PoC client B should receive it over an SO60 bearer using the header-less packet format or over an SO33 bearer using the interleaved/bundled packet format. The PoC server 54 performs re-packetizing from the interleaved/bundled packet format to the header-less packet format if needed. The talk burst 1 is decoded in the PoC client B using its non-native EVRC decoder.

The PoC server 54 forwards the talk burst 1 to PoC client C using the interleaved/bundled packet format over an interactive or a streaming packet switched bearer. The PoC server 54 performs re-packetizing if the ptime attribute indicates need for re-packetizing. The talk burst is decoded in the PoC client C.

In response to talk burst 1, the PoC client B sends a talk burst 2. Talk burst 2 is encoded using its native EVRC codec and is sent using the header-less packet format over SO60 to the PoC server 54. The PoC server 54 forwards the talk burst to PoC client A using the interleaved/bundled packet format over SO33 after re-packetizing the EVRC frames from header-less to interleaved/bundled packet format. The talk burst 2 is decoded in the PoC client A using its native EVRC codec.

The PoC server 54 forwards the talk burst to PoC client C using the interleaved/bundled packet format over an interactive or a streaming packet switched bearer. The PoC server 54 must re-packetize the EVRC frames (from header-less to interleaved/bundled packet format). The talk burst is decoded in the PoC client C using its non-native EVRC decoder.

The PoC client C sends a talk burst 3 using its native AMR codec. Talk burst 3 is encoded using AMR, and the PoC client C must chose the default AMR mode (here AMR5.15). The AMR frames are sent bundled (4 frames per packet) using an interactive or a streaming packet switched bearer. The PoC server 54 forwards the talk burst 3 to PoC client A over SO33 after re-packetizing if the ptime attribute indicates the need for re-packetizing. The talk burst is decoded in the PoC client A using it non-native AMR decoder. The PoC server 54 forwards the talk burst 3 to PoC client B over SO3 after re-packetizing if the ptime attribute indicates a need. The talk burst 3 is decoded in the PoC client B using it non-native AMR decoder.

It may be that a PoC client may include multiple codecs but nevertheless may use this kind of SIP/SDP message to indicate that the preferred codec may only be used to encode speech and that the other codec(s) will only be used for speech decoding of speech encoded using a non-preferred speech encoding format. In an SDP message, codecs may be listed in a preferred order. For example, a different low complexity default codec, e.g., a G.711 sendrecv could be listed before EVRC recvonly.

The interoperability technology described above provides interoperability between different UEs that have different speech processing configurations and capabilities. That interoperability is achieved without the expense of multiple codecs in each UE and without expensive and complex transcoding equipment in the network server since most speech processing complexity and cost is in the encoder. By avoiding complex transcoding, intrinsic speech quality is also prevented from deteriorating as it may do when transcoded. Hence, a major benefit of using an "asymmetric" setup as described above is maintaining intrinsic speech quality. In addition, it possible to use one native speech encoder for optimum performance for the encoding process and still be able to decode a number of other speech formats, for instance, using downloadable software decoders. Speech decoders usually have lower complexity then speech encoders and therefore need less "computing power." Accordingly, the speech decoder can use an "all-purpose" CPU rather than a DSP. And a service provider can readily offer interoperability by provisioning clients with a new decoder when needed.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC § 112 unless the words "means for" are used.

The invention claimed is:

1. A method for providing communications interoperability between multiple wireless user communication devices in a communications system that have different speech processing configurations, comprising:

encoding in a primary speech codec of a first wireless user communication device a first speech message using a first speech encoding format;

sending the encoded speech to a second wireless user communications device that includes a primary speech codec supporting a second speech encoding format;

receiving from the second wireless user communications device a second speech message encoded using the second speech encoding format; and decoding the second speech message using a secondary speech decoder supporting decoding of the second speech encoding format, wherein the first wireless user communication device does not support speech encoding using the second speech encoding format, wherein the first wireless user communication device and the second wireless user communication device are engaged in a Push-to-talk (PTT) communication where only one way communication is permitted and an operator of one of the wireless user communication devices must press a push-to-talk button on the wireless user communication device to transmit information to the other wireless user communication device, and wherein the PTT communication is a PTT over Cellular (PoC) communication and the first and second wireless user communication devices are first and second PoC clients, respectively.

2. The method in claim 1, wherein the first speech message is transported using a first type of transport bearer that uses a first packetizing of speech encoded frames, and wherein the second speech message is transported using a second type of packetizing of speech encoded frames.

3. The method in claim 2, wherein the communication system includes a server for supporting the communication between the first and second wireless user devices, the method further comprising the server re-packetizing at least a portion of the first speech message before the first speech message is sent to the second wireless user communication device.

4. The method in claim 3, further comprising the first wireless user communication device sending the server a signaling message that includes one or more attributes indicating that the first wireless user communication device supports speech encoding and decoding using the first speech encoding format, decoding of speech encoded using the second speech encoding format, but does not support encoding speech using the second speech encoding format.

5. The method in claim 4, wherein the signaling message includes one or more attributes indicating that the first wireless user communication device supports a first transport bearer format for speech encoded using the first speech encoding format and a second transport bearer format for speech encoded using the second speech encoding format.

6. A wireless user communication device having a native speech processing configuration, comprising:

a native codec supporting encoding and decoding using a first speech encoding format for encoding a first speech message using the first speech format;

a transmitter for sending the encoded first speech message to a second wireless user communications device that includes a native speech codec supporting a second speech encoding and decoding format;

a receiver for receiving from the second wireless user communications device a second speech message encoded using the second speech encoding format; and a non-native decoder for decoding the second speech message using a secondary speech decoder supporting decoding of the second speech encoding format, wherein the first wireless user communication device is configured to not support speech encoding using the second speech encoding format.

7. The wireless user communication device in claim 6, wherein the first speech message is associated with a first type of transport bearer that uses a first packetizing of speech encoded frames, and wherein the second speech message is associated with a second type of transport bearer that uses a second packetizing of speech encoded frames.

8. The wireless user communication device in claim 6, wherein the transmitter is configured to send to a server a signaling message that includes one or more attributes indicating that the wireless user communication device supports encoding and decoding of speech encoded using the first speech encoding format, decoding of speech encoded using the second speech encoding format, but does not support encoding speech using the second speech encoding format.

9. The wireless user communication device in claim 8, wherein the signaling message includes one or more attributes indicating that the wireless user communication device supports a first transport bearer format for speech encoded using the first speech encoding format and a second transport bearer format for speech encoded using the second speech encoding format.

10. The wireless user communication device in claim 6, wherein the wireless user communication device is configured to engage in a Push-to-talk (PTT) over Cellular (PoC) type communication.

11. A server in a communications system for supporting communications interoperability between multiple wireless user communication devices having different speech processing attributes, comprising:

receiving circuitry for receiving from a first wireless user communication device a speech message encoded using a first speech encoding format;

processing circuitry for determining a second destination wireless user communication device having a primary speech codec supporting a second speech encoding format and secondary speech decoder for decoding speech encoded using the first speech encoding format;

re-packetizing circuitry for re-packetizing the speech message into a different transport format associated with speech processing attributes of the second wireless user communications device; and transmitting circuitry for transmitting the re-packetized speech to the second wireless user communications device for decoding the re-packetized speech in the first speech encoded format in the second wireless user communications device, wherein the second wireless user communication device is configured to not support speech encoding using the first speech encoding format.

12. The server in claim 11, wherein the speech message is transported using a first type of transport bearer that uses a first packetizing of speech encoded frames, and wherein the re-packetized speech is transported using a second type of transport bearer that uses a second packetizing of speech encoded frames.

13. The server in claim 11, wherein the receiving circuitry is configured to receive from the first wireless user communication device a signaling message that includes one or more attributes indicating that the first wireless user communication device supports encoding and decoding of speech encoded using the first speech encoding format, decoding of speech encoded using the second speech encoding format, but does not support encoding speech using the second speech encoding format.

14. The server in claim 13, wherein the signaling message includes one or more attributes indicating that the first wireless user communication device supports a first transport bearer format for speech encoded using the first speech encoding format and a second transport bearer format for speech encoded using the second speech encoding format.

15. The server in claim 11, wherein the receiving circuitry is configured to receive from the second wireless user communication device a signaling message that includes one or more attributes indicating that the second wireless user communication device supports encoding and decoding of speech encoded using the second speech encoding format and decoding of speech encoded using the first speech encoding format.

16. The server in claim 15, wherein the signaling message includes one or more attributes indicating that the second wireless user communication device supports a second transport bearer format for speech encoded using the second speech encoding format and a first transport bearer format for speech encoded using the first speech encoding format.

17. The server in claim 11, wherein the first wireless user communication device and the second wireless user communication device are engaged in a push-to-talk (PTT) type communication, and wherein the PTT communication is a PTT-over-Cellular (PoC) communication and the first and second wireless user communication devices are first and second PoC clients, respectively.

18. A push-to-talk (PTT) over cellular (PoC) server for use in a communications system for supporting communications interoperability between PoC user communication devices having different speech processing attributes involved in a PoC communication, comprising:

receiving circuitry for receiving from a first PoC user communication device a speech message encoded using a first speech encoding format;

processing circuitry for determining a second destination PoC user communication device supporting a second speech encoding format;

re-packetizing circuitry for re-packetizing the speech message into a different transport format associated with speech processing attributes of the second PoC user communications device; and transmitting circuitry for transmitting the re-packetized speech to the second PoC user communications device for decoding the re-packetized speech in the first speech encoded format in the second PoC user communications device.

19. The server in claim 18, wherein the speech message is transported using a first type of transport bearer that uses a first packetizing of speech encoded frames, and wherein the re-packetized speech is transported using a second type of transport bearer that uses a second different packetizing of speech encoded frames.

* * * * *

UNITED STATES PATENT AND TRADEMARK OFFICE
CERTIFICATE OF CORRECTION

PATENT NO. : 7,463,901 B2
APPLICATION NO. : 11/197768
DATED : December 9, 2008
INVENTOR(S) : Svedberg et al.

Page 1 of 1

It is certified that error appears in the above-identified patent and that said Letters Patent is hereby corrected as shown below:

In Column 4, Line 65, delete "(oining)" and insert -- (joining) --, therefor.

In Column 6, Line 8, delete "(O33)." and insert -- (SO33). --, therefor.

In Column 9, Line 66, delete "EVRCO/8000)." and insert -- EVRC0/8000). --, therefor.

In Column 11, Line 23, delete "SO3" and insert -- SO33 --, therefor.

Signed and Sealed this

Twenty-fourth Day of November, 2009

David J. Kappos
*Director of the United States Patent and Trademark Office*